Figure 1:
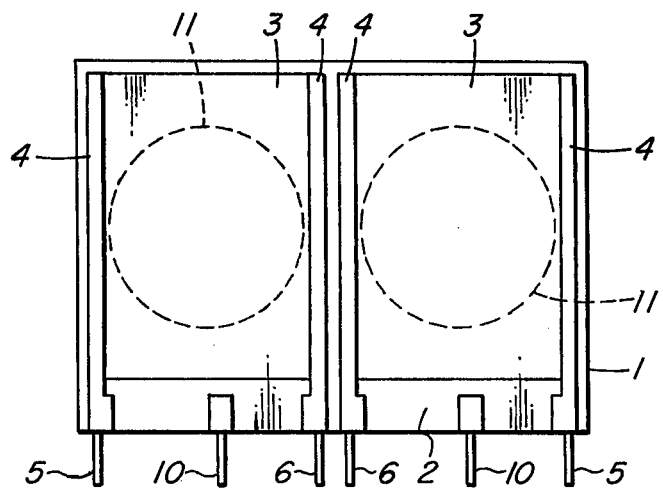

United States Patent [19]

Jakab

[11] Patent Number: 4,467,310

[45] Date of Patent: Aug. 21, 1984

[54] TELEPHONE SUBSCRIBER LINE BATTERY FEED RESISTOR ARRANGEMENTS

[75] Inventor: Gyula Jakab, Nepean, Canada

[73] Assignee: Northern Telecom Limited, Montreal, Canada

[21] Appl. No.: 538,771

[22] Filed: Oct. 3, 1983

[51] Int. Cl.³ .......................... H01C 7/10; H02H 5/04
[52] U.S. Cl. .................... 338/22 R; 338/23; 338/25; 338/308; 338/319; 320/35
[58] Field of Search .................... 338/22–25, 338/307–309, 195, 319–320, 203; 361/27, 106; 320/35, 36

[56] References Cited

U.S. PATENT DOCUMENTS

| | | | |
|---|---|---|---|
| 3,914,727 | 10/1975 | Sabricius | 361/106 X |
| 4,255,698 | 3/1981 | Simon | 361/106 X |
| 4,413,301 | 1/1983 | Middleman et al. | 338/22 R X |

FOREIGN PATENT DOCUMENTS 2331708  1/1975  Fed. Rep. of Germany ...... 361/106

OTHER PUBLICATIONS

Doljak, "Polyswitch PTC Devices—A New, Low Resistance Conductive Polymer—Based PTC Device for Overcurrent Protection", Proceedings of 31st Electronic Components Conference, Atlanta, May 11–13, 1981, pp. 313–319.

Primary Examiner—Roy N. Envall, Jr.
Assistant Examiner—Christopher N. Sears
Attorney, Agent, or Firm—R. John Haley

[57] ABSTRACT

Battery feed resistors are constituted by thick film resistors on a substrate, electrically in series with switching type positive temperature coefficient (PTC) resistors which are closely thermally coupled to the thick film resistors by being mounted on the substrate behind the thick film resistors or on insulating layers over the thick film resistors. Precise battery feed resistances and matching of pairs of battery feed resistors are achieved by trimming the thick film resistors. The PTC resistors prevent excessively high temperatures being reached in the event that external high voltages are applied to a telephone subscriber line to which the battery feed resistors are connected.

14 Claims, 5 Drawing Figures

TELEPHONE SUBSCRIBER LINE BATTERY FEED RESISTOR ARRANGEMENTS

This invention relates to telephone subscriber line battery feed resistor arrangements.

It is well known to couple a telephone central office common battery supply to a two-wire balanced telephone subscriber line via two battery feed resistors in order to provide loop current on the subscriber line. The battery feed resistors must be closely matched to maintain the balance of the line, and are desirably of small physical size. To these ends, it is advantageous to use thick film resistors on a substrate as the battery feed resistors.

The use of thick film battery feed resistors presents a problem in the event that a relatively high external voltage is applied to one or both wires of the subscriber line, such as occurs if a power line comes into contact with the subscriber line. In such a situation the resistors, which do not necessarily fail to an open-circuit condition, can become heated by the resultant current flow to such a temperature that they pose a fire risk to the telephone central office.

An object of this invention is to provide a telephone subscriber line battery feed resistor arrangement which enables this risk to be reduced or avoided.

According to this invention there is provided a telephone subscriber line battery feed resistor arrangement comprising an insulator, a thick film resistor on one side of the insulator, a positive temperature coefficient (PTC) resistor on another side of the insulator opposite the thick film resistor whereby the thick film resistor and the PTC resistor are thermally coupled together via the insulator, and means electrically connecting the thick film resistor and the PTC resistor in series to form a battery feed resistor.

The arrangement preferably includes a second thick film resistor and a second PTC resistor on opposite sides of the insulator whereby the second thick film resistor and the second PTC resistor are thermally coupled together via the insulator, and means electrically connecting the second thick film resistor and the second PTC resistor in series to form a second battery feed resistor, the two PTC resistors being matched and at least one of the thick film resistors being trimmed whereby the two battery feed resistors have closely matched resistances.

Thus in accordance with this invention each battery feed resistor is constituted by a thick film resistor electrically in series with and closely thermally coupled to a PTC resistor. In the event that a high external voltage is applied to the subscriber line, the increasing temperature of the thick film resistor produces a corresponding increase in the temperature, and hence the resistance, of the PTC resistor to provide a current and temperature limiting effect. This has the advantage that upon removal of the external voltage the battery feed resistor returns to its normal ambient temperature and operates normally.

In order to provide each battery feed resistor with a precisely determined resistance at a predetermined ambient temperature, such as 25° C., in spite of the very wide resistance tolerance of PTC resistors, preferably both of the thick film resistors are trimmed. Although individual PTC resistors have a wide resistance tolerance, PTC resistors manufactured in the same batch can be closely matched so that, after trimming the thick film resistors, the two battery feed resistors maintain the required balance of the subscriber line.

Each PTC resistor is preferably a switching type PTC resistor having a resistance which increases to a high value, for example 100 kilohms, at an elevated temperature, above said predetermined ambient temperature, for example at a temperature of 120° C. to 130° C. In addition, each PTC resistor preferably has a nominal resistance at said predetermined ambient temperature which is much less than, e.g. about one tenth, that of each thick film resistor.

Conveniently both of the thick film resistors are on said one side of the insulator and both of the PTC resistors are on said another side of the insulator.

In one embodiment of the invention the insulator is constituted by a substrate having the thick film resistor(s) on one side thereof and the PTC resistor(s) mounted on the other side thereof. Another embodiment of the invention includes a substrate having the thick film resistor(s) thereon, the insulator comprising an insulating layer on the thick film resistor(s). Yet another embodiment of the invention includes a substrate having the two thick film resistors on opposite sides thereof, the insulator comprising two insulating layers, one on each thick film resistor, the two PTC resistors being mounted outwardly of the insulating layers.

Figure 2:
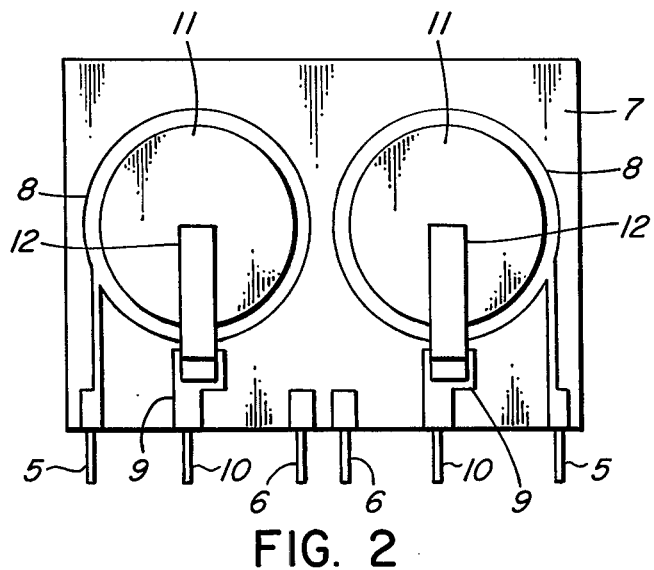
Figure 3:
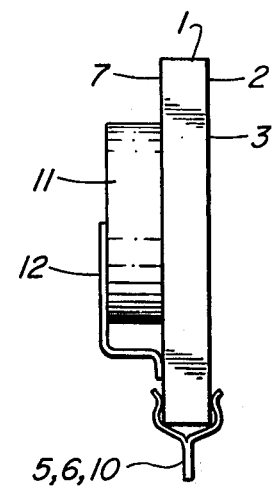
Figure 4:
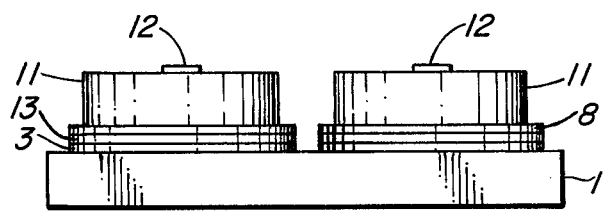
Figure 5:
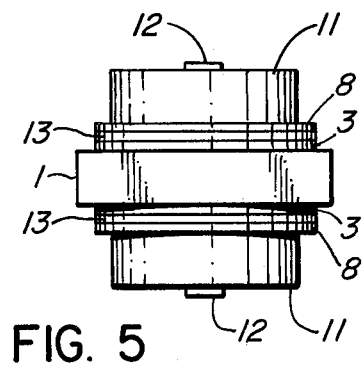

The invention will be further understood from the following description with reference to the accompanying drawings, in which:

FIGS. 1, 2, and 3 respectively illustrate the front and back faces and an end view of a battery feed resistor arrangement in accordance with a first embodiment of the invention; and FIGS. 4 and 5 illustrate side views of battery feed resistor arrangements in accordance with other embodiments of the invention.

Referring to FIGS. 1 to 3 of the drawings, the battery feed resistor arrangement comprises a rectangular ceramic substrate 1, having a size of about 3 cm. by 2 cm., on a front surface 2 of which are formed two similar thick film resistors 3, electrical connections to which are provided by metallized contacts 4 and connecting pins 5 and 6. In view of their similarity, elements of both battery feed resistors in the arrangement shown are denoted by the same reference numerals.

On a rear surface 7 of the substrate 1, on which are formed metallized areas 8 and 9 electrically connected to the pins 5 and further pins 10 respectively, are mounted switching type PTC resistors 11. Each PTC resistor 11 is soldered on one side to a respective metallized area 8 so as to be centrally positioned behind a respective one of the thick film resistors 3, as shown by circles in broken lines in FIG. 1, to ensure the closest possible thermal coupling between each thick film resistor 3 and the PTC resistor 11 behind it. The other side of each PTC resistor 11 is connected to the respective metallized area 9 via a respective electrically conductive contact 12.

The pins 5, 6, and 10 are used to mount the resistor arrangement in conventional manner, for example upright on a printed circuit board (not shown), the pins 6 and 10 being used to make electrical connections to the battery feed resistors, each of which is constituted by one thick film resistor 3 and the PTC resistor 11 connected in series therewith via the respective pin 5.

By way of example, it is observed that each PTC resistor 11 may be a Midwest Components Incorporated type P-57962 PTC resistor, having a resistance of 40 ohms ±25% at an ambient temperature of about 25° C., this resistance falling very slightly with increasing temperature up to about 120° C., and then increasing rapidly with increasing temperature to a resistance of about 100 kilohms at a temperature of about 130° C. The thick film resistors 3 in this case may be trimmed in known manner to provide a total resistance (including the actual resistance of the PTC resistor at ambient temperature) for each battery feed resistor of 392 ohms ±1%, with the two battery feed resistors matched to within 0.3% to maintain good balance of the subscriber line to which the resistor arrangement is connected in use.

It can be seen from the above figures given by way of example that, it normal operating temperatures, the trimmed thick film resistors 3 dominate in determining the battery feed resistances, their resistances being of the order of ten times those of the PTC resistors 11. At high temperatures, which only occur as a result of a power line cross or some other high voltage being externally applied to the subscriber line, the resistance of the PTC resistors 11 drastically increases to limit current flow and avoid any further rise in temperature. On removal of the externally applied voltage, the PTC resistors resume their low resistance state so that the battery feed resistor arrangement again operates normally.

FIGS. 4 and 5 illustrate alternative battery feed resistor arrangements, the same references being used to denote similar parts. For clarity, the pins 5, 6, and 10 are not shown in FIGS. 4 and 5.

In FIG. 4 the two thick film resistors 3 are arranged side-by-side on one side or face of the substrate 1. An insulating layer 13 covers the resistors 3 and their metallized contacts, and on this the metallized areas 8 are formed. The PTC resistors 11 are mounted on the areas 8, and have contacts 12, in the same manner as described above. In this case, thermal coupling between the thick film resistors 3 and the respective PTC resistors 11 is via the thin insulating layer 13. This insulating layer 13 may be interrupted at appropriate points to provide the necessary electrical series connection directly between the metallized areas 8 and the appropriate ones of the contacts 4, whereby the pins 5 can be omitted.

The arrangement of FIG. 5 is similar to that of FIG. 4, except that the two battery feed resistors of the arrangement are arranged back-to-back on opposite sides of the substrate 1, whereby a particularly compact form of the arrangement is achieved. In this case and as shown in FIG. 4 two separate insulating layer portions are provided between the respective thick film resistors 3 and metallized areas 8; obviously a single continuous insulating layer could be provided in the arrangement of FIG. 4.

Although particular embodiments of the invention has been described in detail, the invention is not limited thereto, and numerous modifications, variations, and adaptations may be made without departing from the scope of the invention as defined in the claims.

What is claimed is:

1. A telephone subscriber line battery feed resistor arrangement comprising an insulator, a thick film resistor on one side of the insulator, a positive temperature coefficient (PTC) resistor on another side of the insulator opposite the thick film resistor whereby the thick film resistor and the PTC resistor are thermally coupled together via the insulator, and means electrically connecting the thick film resistor and the PTC resistor in series to form a battery feed resistor.

2. An arrangement as claimed in claim 1 wherein the thick film resistor is trimmed to provide the battery feed resistor with a precisely determined resistance at a predetermined ambient temperature.

3. An arrangement as claimed in claim 2 wherein the PTC resistor is a switching type PTC resistor having a resistance which increases to a high value at an elevated temperature above said predetermined ambient temperature.

4. An arrangement as claimed in claim 3 wherein the PTC resistor has a nominal resistance at said predetermined ambient temperature of about one tenth that of the thick film resistor.

5. An arrangement as claimed in claim 1 wherein the insulator is constituted by a substrate having the thick film resistor on one side thereof and the PTC resistor mounted on the other side thereof.

6. An arrangement as claimed in claim 1 and including a substrate having the thick film resistor on one side thereof, wherein the insulator comprises an insulating layer on the thick film resistor.

7. An arrangement as claimed in claim 1 and including a second thick film resistor and a second PTC resistor on opposite sides of the insulator whereby the second thick film resistor and the second PTC resistor are thermally coupled together via the insulator, and means electrically connecting the second thick film resistor and the second PTC resistor in series to form a second battery feed resistor, the two PTC resistors being matched and at least one of the thick film resistors being trimmed whereby the two battery feed resistors have closely matched resistances.

8. An arrangement as claimed in claim 7 wherein both of the thick film resistors are trimmed to provide each battery feed resistor with a precisely determined resistance at a predetermined ambient temperature.

9. An arrangement as claimed in claim 8 wherein each PTC resistor is a switching type PTC resistor having a resistance which increases to a high value at an elevated temperature above said predetermined ambient temperature.

10. An arrangement as claimed in claim 9 wherein each PTC resistor has a nominal resistance at said predetermined ambient temperature of about one tenth that of each thick film resistor.

11. An arrangement as claimed in claim 7 wherein both of the thick film resistors are on said one side of the insulator and both of the PTC resistors are on said another side of the insulator.

12. An arrangement as claimed in claim 7 wherein the insulator is constituted by a substrate having both thick film resistors on one side thereof and both PTC resistors mounted on the other side thereof.

13. An arrangement as claimed in claim 7 and including a substrate having both thick film resistors on one side thereof, wherein the insulator comprises an insulating layer on the thick film resistors.

14. An arrangement as claimed in claim 7 and including a substrate having the thick film resistors on opposite sides thereof, wherein the insulator comprises two insulating layers, one on each thick film resistor, and wherein the PTC resistors are mounted outwardly of the insulating layers.

* * * * *